Figure 13:
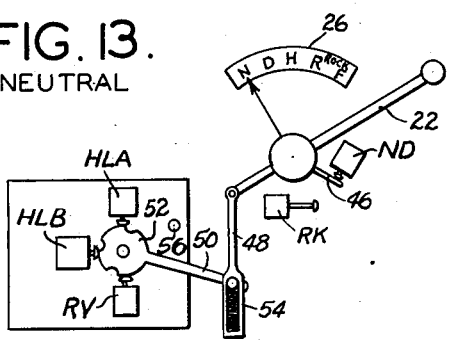

Oct. 28, 1952 M. P. WINTHER 2,615,349
AUTOMATICALLY CONTROLLED TRANSMISSION
Filed Dec. 17, 1949 6 Sheets-Sheet 1
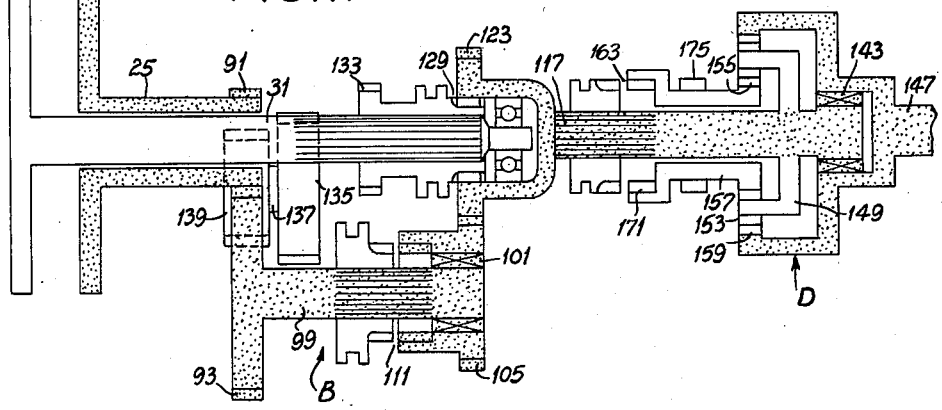
FIG. 1. FIRST GEAR
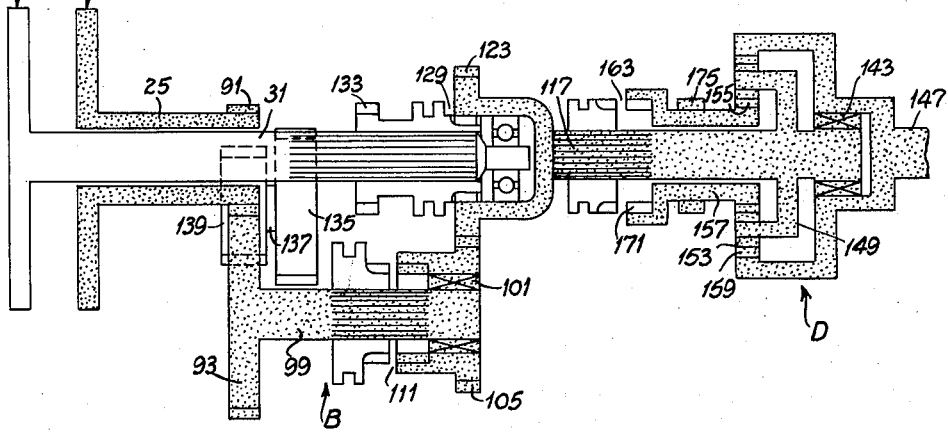
FIG. 2. SECOND GEAR
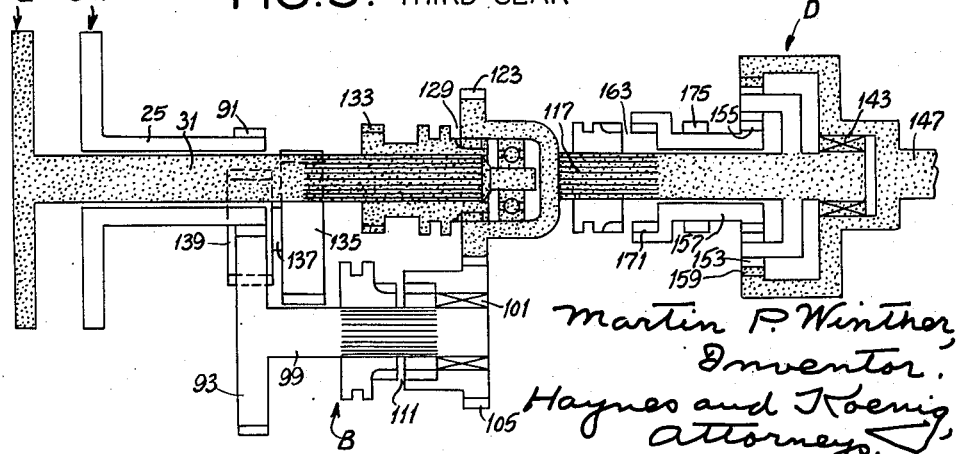
FIG. 3. THIRD GEAR
Martin P. Winther,
Inventor.
Haynes and Koenig
Attorneys.

Oct. 28, 1952     M. P. WINTHER     2,615,349
AUTOMATICALLY CONTROLLED TRANSMISSION
Filed Dec. 17, 1949     6 Sheets-Sheet 2
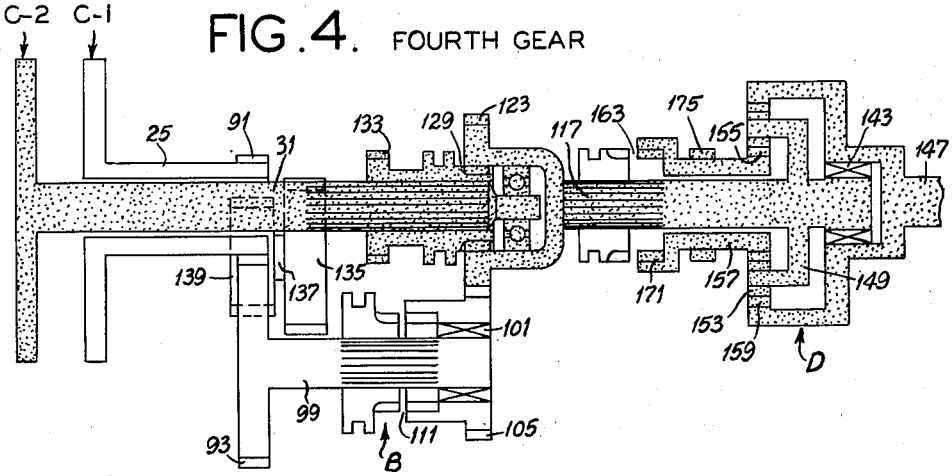
FIG. 4. FOURTH GEAR
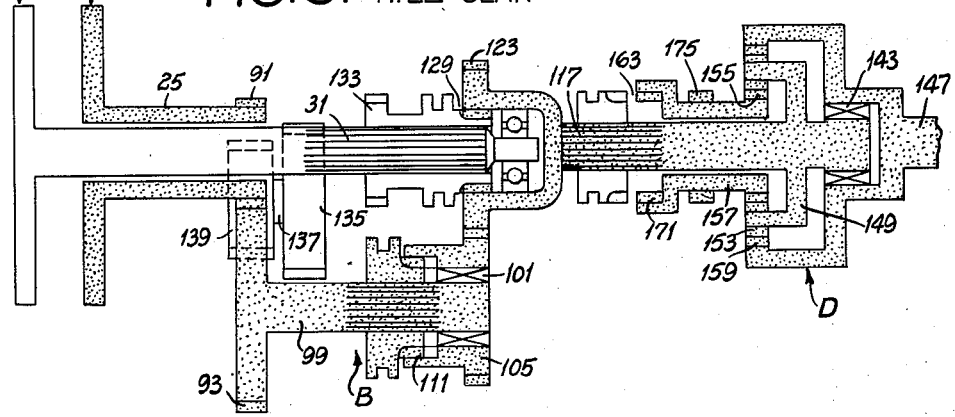
FIG. 5. HILL GEAR
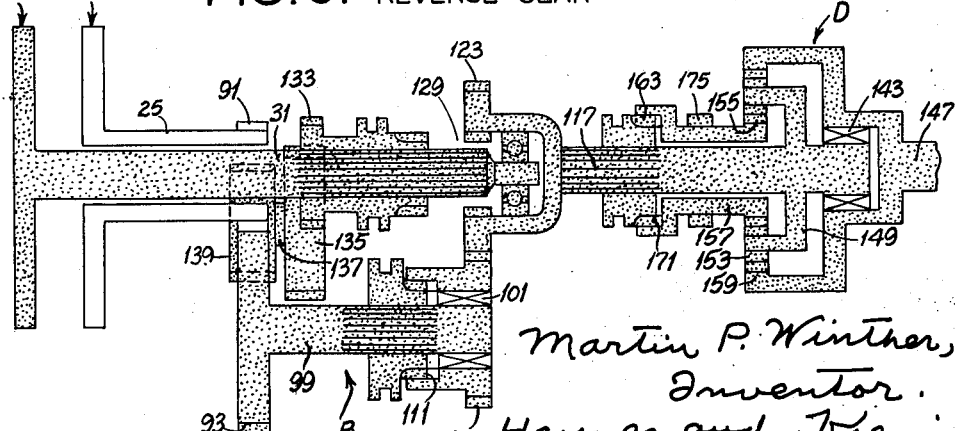
FIG. 6. REVERSE GEAR
Martin P. Winther,
Inventor.
Haynes and Koenig,
Attorneys.

Oct. 28, 1952 M. P. WINTHER 2,615,349
AUTOMATICALLY CONTROLLED TRANSMISSION
Filed Dec. 17, 1949 6 Sheets-Sheet 3
FIG. 7. FIRST GEAR
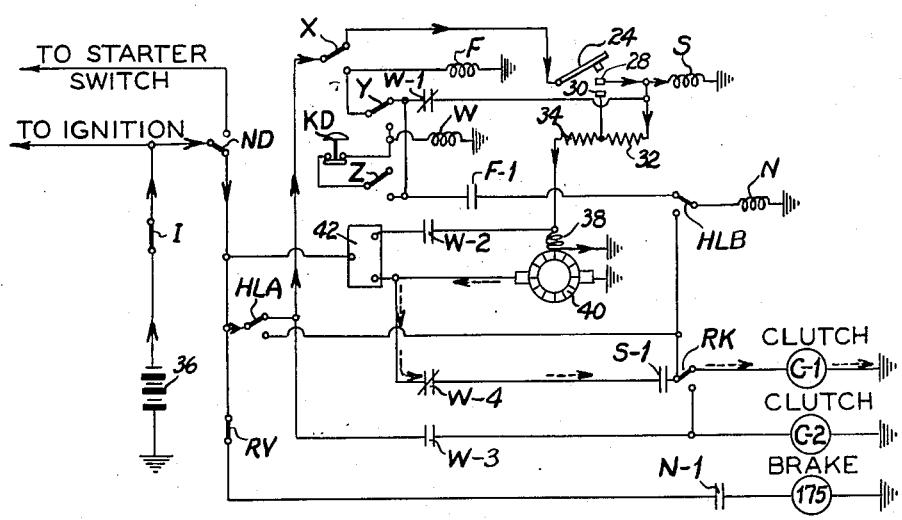
FIG. 8. SECOND GEAR
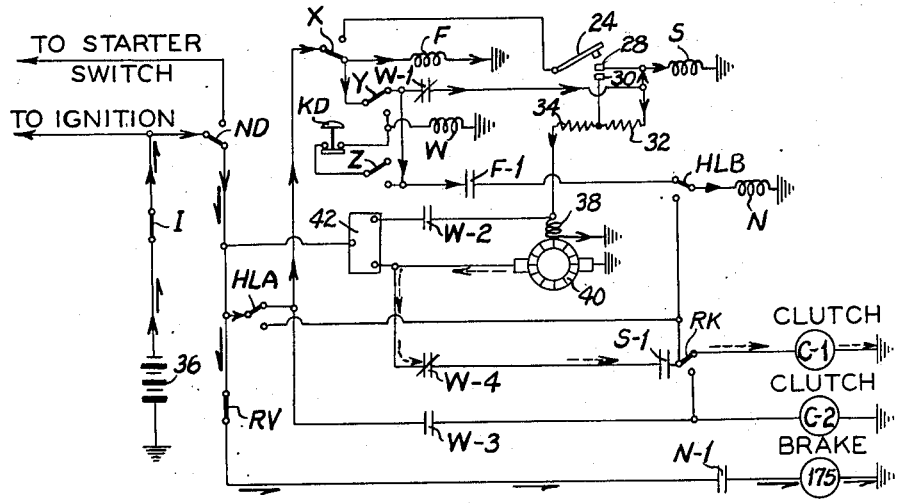
Martin P. Winther
Inventor.
Haynes and Koenig
Attorneys.

Oct. 28, 1952 — M. P. WINTHER — 2,615,349
AUTOMATICALLY CONTROLLED TRANSMISSION
Filed Dec. 17, 1949 — 6 Sheets-Sheet 4
FIG. 9. THIRD GEAR
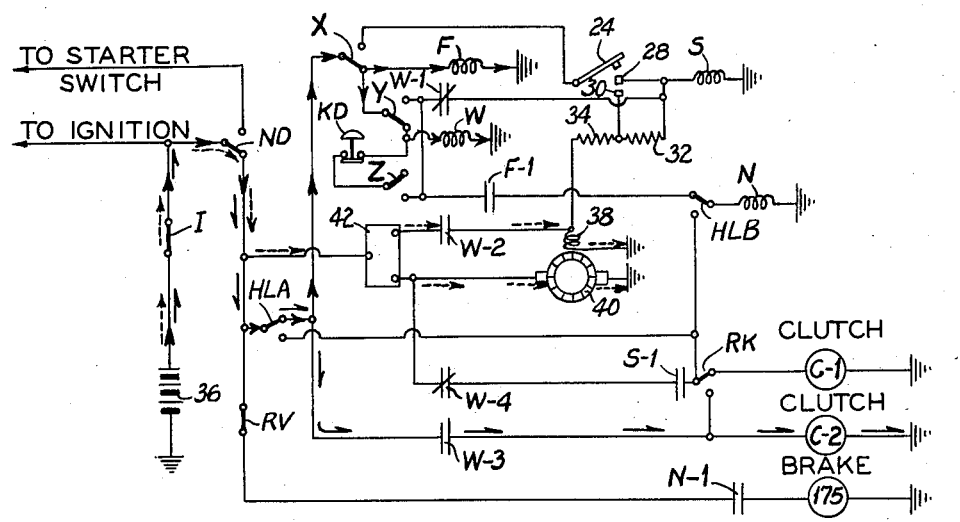
FIG. 10. FOURTH GEAR
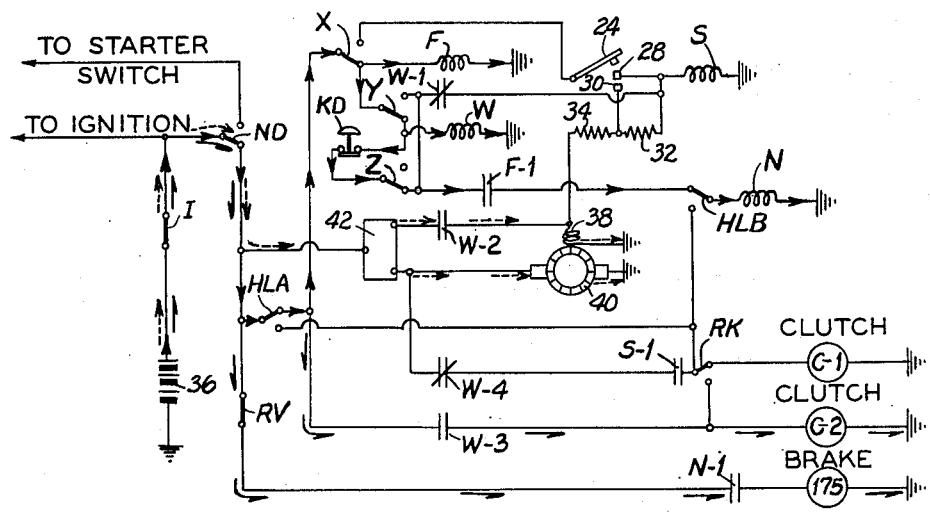
Martin P. Winther,
Inventor.
Haynes and Koenig
Attorneys.

Oct. 28, 1952   M. P. WINTHER   2,615,349
AUTOMATICALLY CONTROLLED TRANSMISSION
Filed Dec. 17, 1949   6 Sheets-Sheet 5
FIG. 11. HILL
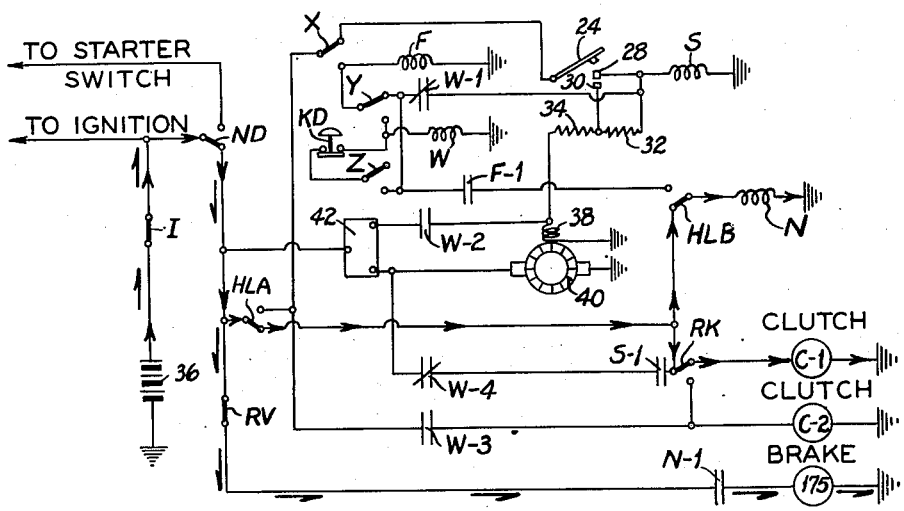
FIG. 12. REVERSE
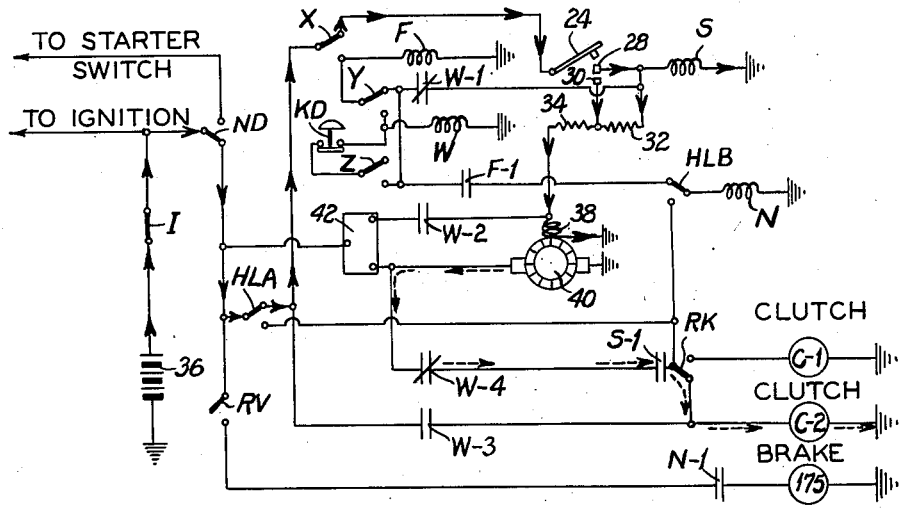
Martin P. Winther
Inventor.
Haynes and Koenig
Attorneys.

Oct. 28, 1952    M. P. WINTHER    2,615,349
AUTOMATICALLY CONTROLLED TRANSMISSION
Filed Dec. 17, 1949    6 Sheets-Sheet 6

NEUTRAL

DRIVE

HILL

REVERSE

ROCKING FORWARD

Martin P. Winther
Inventor
Haynes and Koenig
Attorneys

Patented Oct. 28, 1952

2,615,349

UNITED STATES PATENT OFFICE 2,615,349

AUTOMATICALLY CONTROLLED
TRANSMISSION

Martin P. Winther, Gates Mills, Ohio, assignor to
Martin P. Winther, Waukegan, Ill., as trustee Application December 17, 1949, Serial No. 133,643

27 Claims. (Cl. 74—472)

This invention relates to automatically controlled transmissions particularly for automotive use.

Among the several objects of the invention may be noted the provision of the combination of a transmission of the type disclosed in the United States patent application of myself and Howard J. Findley, Serial No. 125,854, filed November 7, 1949, for Power Transmission (issued as Patent 2,605,650, dated August 5, 1952), and coordinated automatic controls therefor, whereby with minimum manual control subsequent completely automatic operation may be had for accelerating a vehicle through first, second, third and overdrive speeds, the provision of apparatus of the class described which may conveniently and selectively be prepared for operating conditions constituting the following: neutral, four-speed drive, hill gear, reverse and mired vehicle-rocking conditions; and the provision of apparatus of this class which is relatively simple in its mechanical and electrical features, none of which involves any hydraulic couplings, circuits, valves or the like, being simple to adjust for best operating condition and reliably maintaining the same. Other objects will be in part apparent and in part pointed out hereinafter.

Briefly, the invention comprises compound electrical clutches so arranged that by exciting a first one of them it drives a reverted gear train to a driven shaft via a brake-controlled planetary gear train without the latter acting as a torque converter in first gear. By simple electrical control of the brake in the planetary gear train it is brought into planetary action to convert to second gear. By a switch of excitation from the first clutch to the second clutch and a release of the electric brake, third gear or direct drive operation is caused to occur. Then by resetting the brake in the planetary gear, fourth speed or overdrive operation is brought about. Hill gear drive is accomplished by setting up second gear drive conditions and closing a mechanical coupling in the reverted gear train. Reverse gear drive is obtained from conditions similar to those in hill gear except that a reverse gear train is brought into play in connection with the reverted gear train and the torque converting action of the planetary train locked out under conditions of release of said brake. For rocking a vehicle under mired or similar conditions, the simple rocking movement of a lever is sufficient for rapidly and repeatedly converting from reverse to a forward gear.

Briefly, the electrical controls of the present invention consist of circuits for energizing the first and second electric clutches and the electric planetary brake in such sequences as to bring about the various gear connections above specified. First gear is brought into play by a lever movement and accelerator pedal action. Second, third and overdrive gears are brought into play by centrifugally operated switches responsive to vehicle speed of, for example, 12, 20 and 30 M. P. H., respectively. Hill gear is instituted by another lever operation, as is reverse. Rocking action is as stated above brought about by a rocking lever action. All operations are prepared by operation of a single lever. Suitable interlocks under control of said lever prevent inconsistent gear connections.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Figs. 1–6 are structural mechanical diagrams illustrating by stippling power flow under conditions respectively of first, second, third, fourth, hill and reverse gear operations;

Figs. 7–12 each illustrate a wiring diagram upon which are indicated closed circuits respectively coordinated with the remaining figures to show conditions for first, second, third, fourth, hill and reverse gear operations, the circuit closures being shown by properly changed switch positions and dotted lines representing current flow; and, Figs. 13–17 are diagrammatic views of a single lever control system operated from a steering column for the mechanical settings required to be made as indicated by Figs. 1–6, and for the electrical settings as indicated in Figs. 7–12.

Similar reference characters indicate corresponding parts throughout the several views of the drawings.

Complete details of the mechanical parts illustrated herein in Figs. 1–6 will be found in said patent. There is, however, sufficient information in said Figs. 1–6 herein and the description below for a complete understanding of the present invention. The reference numbers used herein in connection with Figs. 1–6 are the same as those used for corresponding parts in said application.

Referring now more particularly to Figs. 1–6 herein, C–1 is an electrically operated friction clutch which may be referred to as a low gear clutch because during acceleration it operates first. C-2 is an electrically operated friction clutch may be referred to as a high gear clutch because it operates subsequently during acceleration.

which will be described below. In reading Figs. 1-6 and the operating table, it is to be understood that the driving elements clutches C-1 and C-2 are driven from a common source such as the engine of a vehicle carrying the transmission.

*Operating table*

| Item | Operation | | | | | | |
|---|---|---|---|---|---|---|---|
| | First Gear | Second Gear | Third Gear | Fourth Gear | Hill Gear | Reverse Gear | Rocking Action |
| Clutch C-1 | Closed | Closed | Open | Open | Closed | Open | Closed. |
| Clutch C-2 | Open | Open | Closed | Closed | Open | Closed | Open. |
| Dental Coupling 129 | Closed | Closed | do | do | Closed | Opened | Opened. |
| Dental Coupling 111 | Opened | Opened | Opened | Opened | Closed | Closed | Closed. |
| Overrunning Clutch 101 | Locks | Locks | Releases | Releases | Immobilized | Immobilized | Immobilized. |
| Dental Coupling 163 | Opened | Opened | Opened | Opened | Opened | Closed | Closed. |
| Overrunning Clutch 143 | Locks | Releases | Locks | Releases | Releases | Immobilized | Immobilized. |
| Brake Drum 175 | Released | Locked | Released | Locked | Locked | Released | Released. |
| Gears 133 and 135 | Unmeshed | Unmeshed | Unmeshed | Unmeshed | Unmeshed | Meshed | Meshed. |

Clutch C-1 drives a quill 25 on which is a gear 91 meshing with a gear 93. Gear 93 through a central member 99 transmits motion to a gear 105 through an overrunning roller clutch 101. This clutch closes when in forward drive and gear 93 tends to overrun gear 105, but clutch 101 opens when gear 105 tends to overrun gear 93. Clutch 101 may be immobilized by closing a dental coupling 111 between member 99 and gear 105, with the result that gears 93 and 105 will operate as a solid cluster in either direction of motion or of power flow. For this purpose one member of the dental coupling 111 is splined to the member 99. Gear 105 meshes with a gear 123 coupled with an intermediate driven shaft 117. Gears 91 and 93, 105 and 123 form a fixed-center reverted gear train generally indexed B.

Shaft 117 supports a carrier 149 for the planet gears 153 of a planetary gear train indexed generally at D having sun gear 155 and an annular orbit gear 159, both 155 and 159 meshing with the planet gears. The driven orbit gear 159 is attached to the final driven shaft 147. An overrunning roller clutch 143 connects intermediate shaft 117 with shaft 147 in such a way that it locks when, in forward drive, shaft 117 tends to overrun 147, but releases when shaft 147 tends to overrun 117. Operative on an extension 157 from the sun gear 155 is an electric brake 175 adapted to be set when excited. The sun gear 155 may be connected to rotate with the shaft 117 by means of a dental coupling 163. One element of the dental coupling 163 is splined to the shaft 117.

The clutch C-2 drives a shaft 31. Splined to the shaft 31 is a member which at the left is formed as a gear 133 and at the right as an element of a dental coupling 129. By sliding this member to the right a direct coupling can be made between shaft 31 and shaft 117. By sliding it to the left, the dental coupling 129 is opened and gear 133 may be meshed with a gear 135. This gear 135, through a member 137, is clustered with a gear 139 meshing with the gear 93. This provides a condition for reverse gear operation.

The stippling in Figs. 1-6 shows the power flow for the various gears indicated, and the operating table below indicates the conditions required of the various elements in said figures for the respective operations. The showings of the various parts in these Figs. 1-6 correspond to the entries in the operating table. The operating table includes a column for rocking action From the above description, Figs. 1-6 and the above operating table it will be noted that there are six controllable elements which are energized or actuated in certain combinations so that desired sequential gear change operations are effected. These elements are clutch C-1, clutch C-2, dental couplings 111, 129, 163 and brake 175. As to the overrunning clutches 101 and 143 their conditioning (either locked or released) is dependent upon relative shaft rotations, which in turn depend upon the positioning of dental couplings 111 and 163, respectively. As gears 133 and 135 are meshed only when dental coupling 129 is opened, their operation depends upon the operation of coupling 129. The stated six controllable elements are responsive broadly (a) to the manual positioning of a control lever (conventionally mounted on the vehicle steering post and indicated generally at numeral 22 in Figs. 13-17), (b) the speed of the vehicle engine, (c) the speed of the driven shaft 147 and (d) the positioning of an accelerator pedal 24, as illustrated in Figs. 7-12. The exemplary modification illustrated in these drawings utilizes mechanical linkages between lever 22 and the three dental couplings 111, 129 and 163, respectively. In the usual manner these linkages operate shifter forks used in connection with the grooves forming parts of the couplings. In the interest of simplicity and brevity these linkages are not illustrated, their arrangement being a matter of choice and well-known to those skilled in the art. It is sufficient to say, therefore, that the positioning of these three dental couplings is determined only by movement of lever 22 so as to obtain the conditions shown in the above operating table and described below.

The arrangement of parts and operation of the lever 22, together with its associated components as shown in Figs. 13-17, and the circuit components shown in Figs. 7-12, will be explained concurrently. The control lever has associated with it an indicator 26 to indicate to the driver which of the five possible positions, Neutral (N), Drive (D), High (H), Reverse (R) or Forward (F) is under selection, and five switches designated as ND (for neutral-drive), RK (for rocking action), RV (for reverse action), HLA and HLB (for hill operation).

Switches RK and ND are responsive to the movement of the lever arm 22 through a lever extension 46. Switches RV, HLA and HLB may be actuated by movement of lever arm 22 through operation of a pair of links 48 and 50 and a cam 52. A spring loaded lost-motion connection between links 48 and 50 is indicated at numeral 54. A stop 56 for cam 52 is provided so as to prevent its counterclockwise rotation past position R illustrated in Fig. 16. Cam 52 is also sufficiently biased in a clockwise direction to move from position R to positions H and D when lever 22 is moved counterclockwise.

The five switches ND, RK, RV, HLA and HLB together with switch contacts 28 and 30 of accelerator 24 and various contactors F, S, N and W, speed-responsive centrifugal governor switches X, Y and Z of the double throw type, a kickdown switch KD and, resistors 32 and 34, as well as some other conventional electrical components of a standard automobile are all associated in an electrical control network illustrated in Figs. 7-12. For simplicity, the contacts of each contactor have their designation initiated by the reference letter of the controlling coil. That is, for example, contacts W-1, W-2, W-3 and W-4 are all responsive to the energization of contactor coil W.

In illustrating the contacts of these various contactors, those normally open contacts which are closed when their controlling contactor coil is energized are differentiated from normally closed contacts which are opened when their contactor coil is energized by drawing a line through the symbol of the contacts at an angle thereto so as to indicate the latter type. The terms "normally open" and "normally closed" refer to conditions of a switch when its contactor coil is deenergized.

*Neutral*

The electrical conditions when lever 22 is positioned at N will be considered initially (Fig. 13). At this time only, will it be possible to energize the starter through the starter switch. Then if an ignition switch I is closed the vehicle motor may be started. In this position the remainder of the circuit is disconnected from the battery. At all other positions of lever 22 (Figs. 14-17) switch ND will be open in respect to the starter switch (see Figs. 7-12).

*First gear drive*

Figure 14:
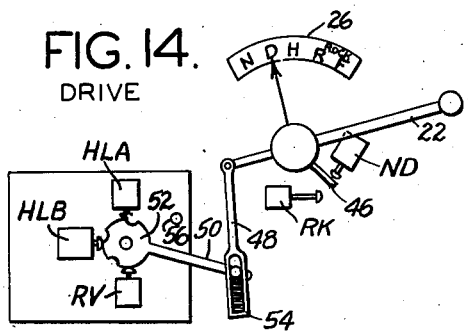

When lever 22 is moved from N to D (Figs. 13 and 14) two electrical circuits are initially completed. The first of these is shown by arrowheads on Fig. 7 and is completed from the vehicle battery 36 through then closed ignition switch I, lever controlled switches ND and HLA, speed controlled switch X, accelerator contacts 28, resistors 32 and 34 and a field coil 38 of the car generator 40, then to ground. As shown in Figs. 13 and 14 there is no modification of the positioning of double throw switches HLA and HLB. They remain as shown in Fig. 7 due to the lost-motion connection 54. Switch X is responsive to vehicle speed which accords with the speed of shaft 147. Switch X remains in its initial position of Fig. 7 until the vehicle speed attains a pre-set value, such as for example, 12 M. P. H. Contactor S is, therefore, energized when the accelerator is depressed sufficiently to close contacts 28. The second circuit completed is shown by dotted arrows on Fig. 7 and includes clutch C-1, armature of generator 40, contacts S-1 of presently energized contactor S and switch RK. Switch W-4 is in its initial position.

Thus, when accelerator pedal 24 is depressed, first closing contacts 28, current will flow through field coil 38 limited only by the resistance of resistors 32 and 34. The output potential of the armature of generator 40 will increase as a function of engine speed and current flow through coil 38. Thus clutch C-1 is modulated shut and ultimately to a fully closed position in response to this increasing output potential of generator 40. A greater depression of the accelerator closes contacts 30 and by-passes resistor 32, thereby increasing the acceleration of the closing modulation of clutch C-1. This electrical action thereby actuates the controllable clutch element C-1 to give transmission operation shown in Fig. 1, clutch C-2 and brake 175 being deenergized. The dental couplings 111 and 163 are, as stated above, in an open condition whereas coupling 129 is held closed, all by the aforesaid suitable mechanical linkages from lever 22. This mechanical condition of these dental couplings is maintained without change when lever 22 is in the position D.

*Second gear drive*

Upon a vehicle speed of approximately 12 M. P. H. being realized, switch X will automatically move from its Fig. 7 to its Fig. 8 position. This completes a first circuit, shown by arrowheads on Fig. 8, between battery 36 and generator coil 38 through switches I, ND, HLA, X, Y, contacts W-1 and resistors 32 and 34. Included in branches (designated by smaller arrowheads), of this circuit are contractors F, S and N, the latter being energized through contacts F-1 and switch HLB. The second circuit completed is identical to that shown by dotted arrows in Fig. 7 (so indicated in Fig. 8) and still operates to energize clutch C-1. There is, however, one distinction between Figs. 7 and 8 in this respect. In Fig. 8 clutch C-1 is not modulated closed in response to speed increase, being already closed. Moreover, the circuit components, such as resistors 32, 34 and field coil 38, are so selected that by the time switch X assumes its Fig. 8 position (12 M. P. H.), the potential output of generator 40 is sufficient to maintain C-1 completely closed.

The third circuit of Fig. 8, shown by half arrows, is that at this time also completed between brake coil 175 and battery 36 through switch RV and contact N-1 (contactor N being energized in the above mentioned second circuit). Thus, clutch C-1 is closed, brake coil 175 is energized to a locked position and the remainder of the controllable elements are conditioned as described in "First Gear Drive" above. The transmission will operate as illustrated in Fig. 2.

*Third gear drive*

A further increase in vehicle speed (for example above 20 M. P. H.) will cause switch Y to throw and cause a circuit rearrangement as shown in Fig. 9 which will deenergize the clutch C-1 and brake 175 and at the same time energize clutch C-2. The first circuit of Fig. 9, designated by arrowheads, is completed between battery 36 and the two contactors F and W through switches I, ND, HLA, X and Y. The second circuit indicated by dotted arrows is completed between the battery 36 and the generator armature 40 through switches I, ND, a standard voltage regulator 42 and contacts W-2. The third circuit, shown by half arrows is completed between battery 36 and clutch C-2 through switches I, ND, HLA and contacts W-3.

These circuits cooperate to energize clutch C-2 to a closed position, without energizing clutch C-1 or brake 175, the circuit to the latter being incomplete because of non-energization of contactor N and corresponding contacts N-1. Clutch C-1 is deenergized because of the opening of contacts W-4 (contactor W being energized in the first circuit) and the open condition of contacts S-1. It is to be noted that at this time generator 40 is connected in a conventional manner so as to charge battery 46 when the latter's state of charge so demands. The controllable clutch element C-2, therefore, is actuated in response to the above circuit energization to cause operation of the automatic transmission as shown in Fig. 3. Clutch C-2 is shut at once and not modulated, such modulation being unnecessary in third gear.

*Fourth gear (overdrive)*

As shown in Fig. 10, the modification of the current flow through the network to cause the actuation of brake 175, in addition to retaining clutch C-2 energized, is accomplished when the speed responsive switch Z changes its position (at a speed of for example 30 M. P. H). The first circuit, shown by arrowhead, is completed between battery 36 and contactors F, W and N, through switches I, ND, HLA, X, Y, an accelerator kickdown switch KD, contacts F-1 and switch HLB. The energization of contactors W and N cause contacts W-3 and N-1 to close, and W-4 to open, thus completing a branched second circuit, shown by half arrows, between battery 36, clutch C-2 and brake 175. The third circuit shown by dotted arrows, is identical to that similarly shown in Fig. 9 and operates in the same fashion. The transmission operation shown in Fig. 4 is thus assured by such circuit energization.

The accelerator kickdown switch KD may be physically mounted under the accelerator 24 so that if this pedal is fully depressed when the vehicle is driven at a speed in excess of 30 M. P. H. (fourth gear), the solid arrowhead circuit of Fig. 10 is broken as KD opens, which will cause an automatic reversion to third speed operation. That is, the opening of the KD contacts by full depression of pedal 24 changes the arrowhead circuit of Fig. 10 to the arrowhead circuit of Fig. 9 (which in turn changes the half arrow circuit of Fig. 10 to that of Fig. 9 so as to energize only clutch C-2). Hence the transmission will operate as shown in Fig. 3 instead of as in Fig. 4. This is desirable if a demand for sudden acceleration arises while driving at vehicle speeds of over 30 M. P. H., as when passing.

It can be seen that after the lever 22 was moved from its N to its D position, in which position dental couplings 111 and 163 were mechanically opened and coupling 129 was closed, all further changes of the controllable elements C-1, C-2 and brake 175 sequentially to change gears from first gear through fourth gear, resulted from automatic actuation of the speed-responsive switches and without further movement of the lever 22. Thus, starting with the vehicle stationary and its motor idling, acceleration is provided in response to accelerator depression up to a vehicle speed of 12 M. P. H., at which switch X changes its position and automatically initiates second gear operation. The change from second to third gears and from third to fourth gears is solely in response to increasing vehicle speed (or speed of shaft 147), switches Y and Z changing position and circuit arrangements at 20 and 30 M. P. H., respectively.

*Hill gear*

If a steep downgrade or a fairly steep upgrade is encountered while driving at speeds in excess of 30 M. P. H., it is desirable that second gear operation be conveniently available by manual selection. This is because in fourth gear operation the braking effect of the motor during downgrade travel may be inadequate and for upgrades steeper than satisfactorily met in third gear (which may be automatically obtained by use of the accelerator kickdown switch KD), second gear would be more satisfactory. For such conditions, the third position of lever 22, hill gear (H) is provided.

Figure 15:
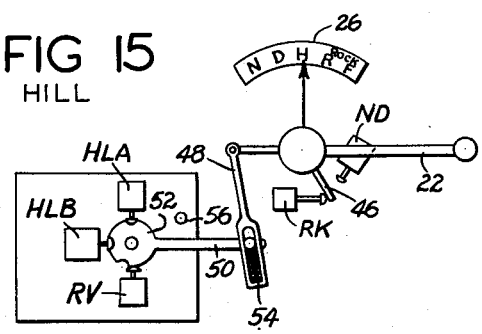

Further manual movement of lever 22 clockwise from position D will bring indicator 26 to this H position (Fig. 15). This manual positioning moves mechanical linkages extending to the dental coupling 111 so as to close it, but does not modify the open condition of coupling 163 and the closed condition of coupling 129. By this action gear 105 is prevented from freely rotating backwards when the vehicle wheels overrun the motor. The same manual movement of lever 22 to H simultaneously changes the positions of switches HLA and HLB (see Figs. 11 and 15). A branched first circuit is thereby set up in Fig. 11 between clutch C-1, contactor N, and battery 36, as indicated by arrowheads. The current flow between battery 36 and clutch C-1 is through switches I, ND, HLA and RK. The energization of contactor N closes contacts N-1 and completes a second circuit, indicated by half arrows, between battery 36 and brake 175 through switches I, ND, RV and contacts N-1. Thus, second gear operation of the automatic transmission is effected, brake 175 and clutch C-2 being energized to close and cause the transmission operation shown in Fig. 5. It is to be noted that the transmission operation is the same in second gear (Fig. 2) and hill gear (Fig. 5) except for the closed condition of dental coupling 111, as is necessary in order to prevent overruning at clutch 101. All speed responsive switches are out of circuit in the H position of lever 22 due to the resulting mechanically modified position of switch HLA. Thus, in the H position gear change is independent of vehicle speed.

*Reverse gear drive*

Figure 16:
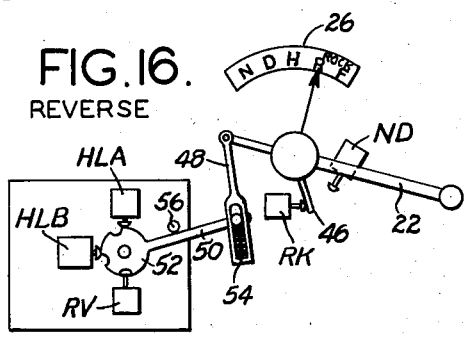
Figure 17:
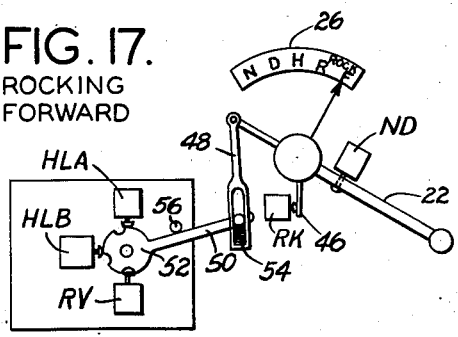

A further manual movement of lever 22 conditions the electrical components of Figs. 7 to 12 and the mechanically linked dental couplings for reverse gear operation (position R of Fig. 16). This manual action closes dental coupling 163, while retaining coupling 111 closed and coupling 129 open. The locking of coupling 163 locks out the planetary action of the planetary train D and it rotates as a unit. The releasing of coupling 129 automatically results in meshing of gears 133 and 135 putting into operation the reverse gear train 133, 135, 137 and 139 between shaft 31 and gear 93. This positioning of lever 22 to R resets switches HLA and HLB to the positions shown in Figs. 7-10, and 12-14 while reversing the position of switches RV and RK.

When accelerator 24 is depressed sufficiently to close contacts 28 (Fig. 12) current will flow in a first circuit between battery 36 and the generator field coil 38 through switches I, ND, HLB, X, contacts 28 and 30 and resistors 32 and 34 as indicated by the arrowheads. Contactor S is simultaneously energized in a branch of this circuit. A second circuit of this Fig. 12 is completed as indicated by dotted arrows between generator 40 and clutch C–2 through contacts W–4, S–1 and switch RK. The clutch C–2 is modulated to a closed position in response to motor speed and accelerator depression (in a fashion analogous to that of clutch C–1 in low gear operation, Fig. 7). This is because the increasing rotational speed of the armature of generator 40 will gradually build up the potential across the magnetic coil of clutch C–2 causing gradual closure thereby. If a more accelerated closure of clutch C–2 is desired, the resistor 32 may be by-passed by further depression of pedal 34, closing contacts 28 and 30, and thus increasing the increment of the output potential of generator 40 per unit increase in armature speed.

It is to be noted that switch RV is opened when lever 22 is moved to position R. This insures that if the vehicle speed rises over 30 M. P. H. in reverse gear that the closure of contacts N–1 (which would occur if switches X, Y and Z were repositioned) will not complete a circuit to brake coil 175 and thus institute second gear operation.

In this condition, reverse gear operation of the transmission is obtained as shown in Fig. 6, controllable elements C–1 and brake 175 being open.

*Rocking action*

It is often desirable to rock a vehicle when mired in mud, snow or the like. Rocking action can readily be brought about simply by alternately energizing and deenergizing clutches C–1 and C–2. This action is obtained by alternate movement of lever 22 from R to F. It will be noted that if lever 22 is moved clockwise from position R to F (Figs. 16 and 17) that the spring loaded linkage 54 biases lever 22 back toward the R position. Thus, by moving lever 22 clockwise and releasing it together with coordinated accelerator actuation, a smooth, but rapid manual alternation from reverse to first gear may be obtained. Switches RV, HLA and HLB associated with lever 22 are uneffected by such rocking movement between "R" and "F" positions, but switch RK is changed from its position in Figs. 7–11, 13–15 and 17 to that illustrated in Figs. 12 and 16 only when in the R position. Switch RK is of the double throw type which may be maintained in one electrical condition when its plunger is fully depressed (Fig. 17) or fully extended (Figs. 13–15), but will change electrical condition if only partially depresesd (Fig. 16).

The operation of the transmission and the circuit arrangements in reverse gear have been described above. In position F the dental couplings 111, 129 and 163 are retained in the same condition as in reverse gear, the only modification of the controllable elements being in energization of clutch C–1 in position F and of C–2 in position R, brake 175 remaining deenergized in either position. The electrical circuit arrangement in F position is the same as that for first gear (Fig. 7) and in position R as is shown in Fig. 12 for reverse gear. This rapid switch over between R and F positions is smooth and simple as only one electrical switch (RK) is alternated which provides for corerspondingly alternate and smooth modulation first of clutch C–2 and then clutch C–1. No physical gear changing is required.

It is to be noted that switch RV is in an opened condition in the R and F positions of lever 22 which (as described under the "Reverse Gear Drive" heading above) prevents the closure of a circuit to brake 175 even if speed switches X, Y and Z are actuated by vehicle speeds over 30 M. P. H. to energize contactor N and thus close contacts N–1.

It is also to be understood that in addition to or in lieu of all or some of the speed responsive switches X, Y and Z, that electrical switches responsive to stimuli other than vehicle speed, for example manifold vacuum, etc., may be utilized. Certain of such arrangements are illustrated and described in the copending application of myself and Anthony Winther, Serial No. 593,236, filed May 11, 1945, now Patent No. 2,540,639, issued February 6, 1951.

It will be observed that although the dental coupling 111 is desirable, its use in the transmission is not absolutely necessary. Its primary purpose is to prevent the necessity for parasitically operating the gears 93, 139, quill 25 and attached parts during third and fourth gear operations (clutch C–1 deenergized) as will be seen by reference to Figs. 3 and 4. For example, this will be clear when it is noted that if the dental coupling 111 were closed (equivalent to elimination) in Figs. 1, 2, 3 and 4, it would make no difference to the power flow operations already described and would only make rotation of the parts 93, 139 and 25 parasitic in the cases of the Figs. 3 and 4 operation.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Control apparatus for a transmission having a driven shaft and a plurality of electrically controlled elements including a clutch and a control brake, which transmission is driven by a prime mover having associated therewith an accelerator, a battery, and an electrical generator driven by said prime mover, the output of the generator varying in accordance with its speed; comprising an electrical network including said battery, a field coil of said generator, and a set of electrical contacts adapted to close upon depression of said accelerator, said battery, coil and contacts being series-connected, a series circuit including an armature of said generator and clutch-operating means adapted to modulate said clutch to closed condition in response to increasing output of the generator, and switch means operated by means responsive to the speed of said driven shaft and adapted to shunt said electrical contacts and to complete a second circuit when said switch is operated, said second circuit including brake-operating means and said battery in series.

2. Control apparatus for a transmission having a driven shaft and a plurality of electrically controlled elements including a first clutch, a second clutch and a control brake, which transmission is driven by a prime mover having associated therewith an accelerator, a battery, and an electric generator driven by said prime mover, the output of the generator varying in accordance with its speed; comprising an electrical network including said battery, a field coil of said generator, and a set of electrical contacts adapted to close upon depression of said accelerator, said battery, coil and contacts being series-connected, a first clutch circuit including in series an armature of said generator and first clutch-operating means adapted to modulate said first clutch to closed condition in response to increasing output of said generator, a first switch means operated by means responsive to the speed of said driven shaft and adapted to shunt said electrical contacts and to complete a second circuit when said shaft speed exceeds a first pre-set value, said second circuit including said battery and brake-operating means in series, and second switch means operated by means responsive to the speed of said driven shaft when it exceeds a second pre-set value, said second switch means being adapted to open said first and second circuits and to complete a third circuit, said third circuit including clutch-operating means for said second clutch and said battery in series.

3. Control apparatus for a transmission having a driven shaft and a plurality of electrically controlled elements including a first clutch, a second clutch and a brake, which transmission is driven by a prime mover having associated therewith an accelerator, a battery, and an electric generator driven by said prime mover, the output of the generator varying in accordance with its speed; comprising an electrical network including said battery, a field coil of said generator, and a set of electrical contacts adapted to close upon depression of said accelerator, said battery, coil and contacts being series-connected, a first circuit including in series an armature of said generator and first clutch-operating means adapted to modulate said first clutch to closed condition in response to increasing output of said generator, first switch means operated by means responsive to the speed of said driven shaft and adapted to shunt said electrical contacts and to complete a second circuit when said shaft speed exceeds a first pre-set value, said second circuit including said battery and brake-operating means in series, second switch means operated by means responsive to the speed of said driven shaft when it exceeds a second pre-set value and adapted to open said first and second circuits and to complete a third circuit, said third circuit including clutch-operating means for said second clutch and said battery in series, and third switch means operated by means responsive to the speed of said driven shaft when it exceeds a third pre-set value and adapted to reenergize said second circuit to reenergize said brake-operating means.

4. Control apparatus as set forth in claim 3 which further includes fourth switch means adapted to open when said accelerator is fully depressed and adapted to effect deenergization of said second circuit.

5. Control apparatus as set forth in claim 3 which further includes switch means adapted to deenergize said second circuit while reenergizing said network and connecting the second clutch-operating means to the armature in place of the first clutch-operating means, whereby said second clutch may be modulated to closed condition in response to increasing generator output.

6. Control apparatus as set forth in claim 3 which further includes a switch means adapted in a first position to connect the first clutch-operating means to the armature and to energize said network and in a second position to connect the second clutch-operating means to the armature and to energize said network, whereby said first and second clutches may be alternately modulated to closed conditions in response to increasing generator output.

7. Control apparatus as set forth in claim 3, which further includes switch means adapted to deenergize said third circuit and to reenergize said second circuit and to interconnect said battery and said first clutch-operating means, whereby the actuation thereof is independent of the actions of said speed responsive switches.

8. Control apparatus for a transmission having a driven shaft and a plurality of electrically controlled elements including a first clutch, a second clutch and a brake, which transmission is driven by a prime mover having associated therewith an accelerator, a battery, and an electric generator driven by said prime mover, the output of the generator varying in accordance with its speed; comprising a first clutch circuit including in series a first set of normally open contacts, a second set of normally closed contacts, an armature of said generator and means operating the first clutch; a second clutch circuit including in series a third set of normally open contacts and means operating said second clutch; a brake circuit including in series a fourth set of normally open contacts and means operating said brake; first, second and third switches operated by means responsive to the speed of the driven shaft and controlling an electrical network and means for actuating said contacts, said switches being adapted to change electrical conditions at first, second and third pre-set values of speed of said driven shaft respectively, said electrical network including in series the battery, a resistor, a field coil of said generator, and a set of contacts associated with said accelerator, said network adapted when said accelerator is depressed to close the accelerator contacts to energize the means for actuating the first set of contacts to close said first clutch circuit through said first set of contacts and thus modulate said first clutch to closed condition in response to increasing generator output, said first speed responsive switch adapted at speeds between the first and second pre-set values to energize said means to actuate said fourth set of contacts to close them and thus energize said brake circuit.

9. Control apparatus for a transmission having a driven shaft and a plurality of electrically controlled elements including a first clutch, a second clutch and a brake, which transmission is driven by a prime mover having associated therewith an accelerator, a battery, and an electric generator driven by said prime mover, the generator output varying in accordance with its speed; comprising a first clutch circuit including in series a first set of normally open contacts, a second set of normally closed contacts, an armature of said generator and means operating the first clutch; a second clutch circuit including in series a third set of normally open contacts and means operating said second clutch; a brake circuit including in series a fourth set of normally open contacts and means operating said brake; first, second and third switches operated by means responsive to the speed of the driven shaft and controlling an electrical network and means for actuating said contacts, said switches being adapted to change electrical conditions at first, second and third pre-set values of speed of said driven shaft respectively, said electrical network including in series the battery, a resistor, a field coil of said generator, and a set of contacts associated with said accelerator, said network adapted when said accelerator is depressed to close the accelerator contacts to energize the means for actuating the first set of contacts to close said first clutch circuit through said first set of contacts and thus modulate said first clutch to closed condition in response to increasing generator output, said first speed responsive switch being adapted at speeds between said first and second pre-set values to energize said means to actuate said fourth set of contacts to close them and thus energize said brake circuit, said second speed responsive switch being adapted at shaft speeds between said second and third pre-set values to operate the means actuating said second and fourth sets of contacts to open them so as to deenergize said first clutch and brake circuits and to operate the means actuating said third set of contacts to close them so as to energize said second clutch circuit.

10. Control apparatus for a transmission having a driven shaft and a plurality of electrically controlled elements including a first clutch, a second clutch and a brake, which transmission is driven by a prime mover having associated therewith an accelerator, a battery, and an electric generator driven by said prime mover, the generator output varying in accordance with its speed; comprising a first clutch circuit including in series a first set of normally open contacts, a second set of normally closed contacts, an armature of said generator and means operating said first clutch; a second clutch circuit including in series a third set of normally open contacts and means operating said second clutch; a brake circuit including in series a fourth set of normally open contacts and means operating said brake; first, second and third switches operated by means responsive to the speed of the driven shaft and controlling an electrical network and means for actuating said contacts, said switches being adapted to change electrical conditions at first, second and third pre-set values of speed of said driven shaft respectively, said electrical network including in series the battery, a resistor, a field coil of said generator, and a set of contacts associated with said accelerator, said network adapted when said accelerator is depressed to close the accelerator contacts to energize the means for actuating the first set of contacts to close said first clutch circuit through said first set of contacts and thus modulate said first clutch to closed condition in response to increasing generator output, said first speed responsive switch being adapted at speeds between said first and second pre-set values to energize said means to actuate said fourth set of contacts to close them and thus energize said brake circuit, said second speed responsive switch being adapted at shaft speeds between said second and third pre-set values to operate the means actuating said second and fourth sets of contacts to open them so as to deenergize said first clutch and brake circuits and to operate the means actuating said third set of contacts to close them so as to energize said second clutch circuit, said third speed responsive switch being adapted at shaft speeds in excess of said third pre-set value to reenergize said means actuating said fourth set of contacts to close them and thus reenergize said brake circuit.

11. Control apparatus as set forth in claim 10 which further includes a fourth switch interconnected between said second and third speed responsive switches and adapted when opened to deenergize the means actuating said fourth set of contacts and thereby deenergize said brake circuit.

12. Control apparatus as set forth in claim 10 which further includes switch means adapted to open the circuit to said third set of contacts thus to deenergize said second clutch circuit and establish a new circuit to the means for actuating the fourth set of contacts to energize said brake circuit, and to interconnect said battery and said first clutch-operating means, whereby the actuation is independent of the actions of said first three switches.

13. Control apparatus as set forth in claim 10 which further includes a switch means adapted to energize only said second clutch circuit through the armature of said generator to modulate said second clutch to closed condition in response to increasing generator output.

14. Control apparatus as set forth in claim 10 which further includes a fourth switch adapted in a first position to energize only said second clutch-operating means through the armature and in a second position to energize only said first clutch circuit, whereby said first and second clutches may be alternately modulated to closed conditions in response to increasing generator output.

15. An automatic transmission adapted to be driven by a prime mover having an accelerator, a battery, and an electric generator driven by said prime mover, the generator output varying in accordance with its speed; comprising first and second selectively operable clutches selectively driving a coaxial driving quill and driving shaft respectively, a coaxial intermediate driven shaft adapted to be operably coupled to said driving shaft, a fixed-center reverted gear train connecting said quill and the intermediate driven shaft, a final driven shaft, an overrunning clutch and a planetary gear connecting said intermediate and final shafts, electrical contacts adapted to close upon depression of said accelerator, said contacts being in an electrical network including in series said battery, a resistor, said contacts and a field coil of said generator; and a first clutch circuit including an armature of said generator in series with clutch-operating means adapted to modulate said first clutch into a fully closed condition in response to increasing generator output whereby the torque passes through the reverted gear train and institutes first gear operation.

16. An automatic transmission adapted to be driven by a prime mover having associated therewith an accelerator, a battery, and an electric generator driven by said prime mover, the generator output varying in accordance with its speed; comprising first and second selectively operable clutches selectively driving a coaxial driving quill and driving shaft respectively, a coaxial intermediate driven shaft adapted to be operably coupled to said driving shaft; a fixed-center reverted gear train connecting said quill and the intermediate driven shaft; a final driven shaft, an overrunning clutch and a planetary gear connecting said intermediate and final shafts, said planetary gear train having a sun gear adapted to be locked by a brake; electrical contacts adapted to close upon depression of said accelerator, said contacts being in an electrical network including in series said battery, said contacts and a field coil of said generator; a first clutch circuit including an armature of said generator in series with clutch-operating means adapted to modulate said first clutch into a fully closed condition in response to increasing generator output whereby the torque passes through the reverted gear train and institutes first gear operation; and a switch operated by means responsive to the speed of said driven shaft adapted to shunt said electrical contacts and to complete a second circuit when the speed of said final shaft exceeds a first pre-set value, whereby said transmission is conditioned for second speed operation, said second circuit including brake-operating means and the battery in series.

17. An automatic transmission adapted to be driven by a prime mover having associated therewith an accelerator, a battery, and an electric generator driven by said prime mover, the generator output varying in accordance with its speed; comprising first and second selectively operable clutches selectively driving a coaxial driving quill and driving shaft respectively; a coaxial intermediate driven shaft adapted to be operably coupled to said driving shaft, a fixed-center reverted gear train connecting said quill and the intermediate driven shaft, a final driven shaft, an overrunning clutch and a planetary gear connecting said intermediate and final shafts, said planetary gear train having a sun gear adapted to be locked by a brake; an electric circuit including means operating said first clutch series-connected with an armature of said generator adapted to modulate said first clutch closed in response to increasing generator output; and a switch operated by means responsive to the speed of said final driven shaft adapted to complete a circuit including brake-operating means and said battery when the speed of said final shaft exceeds a first pre-set value, whereby said transmission is conditioned for second speed operation.

18. An automatic transmission adapted to be driven by a prime mover having associated therewith an accelerator, a battery, and an electric generator driven by said prime mover, the generator output varying in accordance with its speed; comprising first and second selectively operable clutches selectively driving a coaxial driving quill and driving shaft respectively; a coaxial intermediate driven shaft adapted to be operably coupled to said driving shaft, a fixed-center reverted gear train connecting said quill and the intermediate driven shaft, a final driven shaft, an overrunning clutch and a planetary gear connecting said intermediate and final shafts; a first clutch circuit including an armature of said generator in series with means operating said first clutch adapted to modulate said first clutch closed in response to increasing generator output to condition said transmission for first gear operation with torque passing through the reverted gear train; a first switch operated by means responsive to the speed of said final shaft adapted to complete a series circuit including said battery and means operating said brake when said final shaft speed exceeds a first pre-set value to institute second gear operation; and a second switch operated by means responsive to the speed of said final shaft when it exceeds a second pre-set value to open said first clutch circuit and said brake circuit and to complete a series circuit including said battery and means operating said second clutch to operate said clutch and institute third gear operation of said transmission.

19. An automatic transmission adapted to be driven by a prime mover having associated therewith an accelerator, a battery, and an electric generator driven by said prime mover, the generator output varying in accordance with its speed; comprising first and second selectively operable clutches selectively driving a coaxial driving quill and driving shaft respectively; a coaxial intermediate driven shaft adapted to be operably coupled to said driving shaft, a fixed- center reverted gear train connecting said quill and the intermediate driven shaft, a final driven shaft, an overrunning clutch and a planetary gear connecting said intermediate and final shafts; a first clutch circuit including an armature of said generator in series with means operating said first clutch adapted to modulate said first clutch closed in response to increasing generator output to condition said transmission for first gear operation with torque passing through the reverted gear train; a first switch operated by means responsive to the speed of said final shaft adapted to complete a series circuit including said battery and means operating said brake when said final shaft speed exceeds a first pre-set value to institute second gear operation; a second switch operated by means responsive to the speed of said final shaft when it exceeds a second pre-set value to open said first clutch circuit and said brake circuit and to complete a series circuit including said battery and means operating said second clutch to operate said second clutch and institute third gear operation of said transmission; and a third switch operated by means responsive to the speed of said final shaft when it exceeds a third pre-set value adapted to reenergize said brake circuit while retaining said second clutch circuit energized to institute fourth gear operation of said transmission.

20. An automatic transmission adapted to be driven by a prime mover having associated therewith an accelerator, a battery, and an electric generator driven by said prime mover, the generator output varying in accordance with its speed; comprising first and second selectively operable clutches selectively driving a coaxial driving quill and driving shaft respectively; a coaxial intermediate driven shaft adapted to be operably coupled to said driving shaft, a fixed-center reverted gear train connecting said quill and the intermediate driven shaft, a final driven shaft, an overrunning clutch and a planetary gear connecting said intermediate and final shafts; a first clutch circuit including an armature of said generator and means operating said first clutch adapted to modulate said first clutch closed in response to increasing generator output to condition said transmission for first gear operation with torque passing through the reverted gear train; a first switch operated by means responsive to the speed of said final shaft adapted to complete a series circuit including said battery and means operating said brake when said final shaft speed exceeds a first pre-set value to institute second gear operation; a second switch operated by means responsive to the speed of said final shaft when it exceeds a second pre-set value to open said first clutch circuit and said brake circuit and to complete a series circuit including said battery and means operating said second clutch to operate said second clutch and institute third gear operation of said transmission; a third switch operated by means responsive to the speed of said final shaft when it exceeds a third pre-set value adapted to reenergize said brake circuit while retaining said second clutch circuit energized to institute fourth gear operation of said transmission, and a fourth switch adapted when said accelerator is fully depressed to deenergize said brake circuit.

21. An automatic transmission adapted to be driven by a prime mover having associated therewith a battery, comprising a first selectively operable clutch having a first driven member carrying a gear, a second selectively operable clutch having a second driven member carrying one element of an openable first direct coupling, both clutches adapted to be selectively driven from said prime mover, an intermediate shaft carrying a gear and also a driven element of said openable direct coupling, a fixed-center gear train comprising a countershaft supporting a first gear meshing with the gear on said first driven member and a second gear meshing with the gear on said intermediate shaft, an overrunning clutch adapted to connect said last two gears so that the former may drive the latter in a 1:1 ratio or that the latter may overrun the former, an openable coupling between said last mentioned gears adapted when closed to immobilize said overrunning clutch, a final driven shaft interconnected through a planetary gear train to said intermediate shaft, said planetary gear train having a sun gear adapted to be locked by a brake, a control lever movable to a position wherein said openable coupling is closed, switch means associated with said lever adapted to close in said control lever position, said battery being connected through the switch means to means operating said clutch and to means operating said brake to operate them thus to drive the final shaft at a gear ratio greater than 1:1.

22. An automatic transmission adapted to be driven by a prime mover having associated therewith an accelerator, a battery, an electrical generator driven by said prime mover, the generator output varying in accordance with its speed; comprising a first and second selectively operable clutch selectively driving a coaxial driving quill and driving shaft respectively, a coaxial intermediate driven shaft adapted to be coupled to said driving shaft, a fixed-center reverted gear train connecting said quill and the intermediate driven shaft, a final driven shaft, a planetary gear train connecting said intermediate and the final shafts, a reversing gear connectable between the driving shaft and a gear in said reverted train, an openable coupling between the sun gear and the intermediate shaft, an electrical network including in series said battery, a resistor, a field coil of said generator and a set of electrical contacts adapted to close upon depression of said accelerator, an electrical circuit for said first clutch including in series an armature of said generator and clutch-operating means adapted to modulate said first clutch to closed condition in response to increasing generator output to institute first gear operation of said transmission, a control lever movable to a position wherein said openable coupling is closed, and a switch actuable by said lever adapted when said lever is in such position simultaneously to deenergize said first clutch circuit and close a second clutch circuit including said battery and second clutch-operating means adapted to modulate closed said second clutch in response to increasing generator output thus to institute reverse gear operation.

23. An automatic transmission adapted to be driven by a prime mover having associated therewith an accelerator, a battery, and an electrical generator driven by said prime mover, the generator output varying in accordance with its speed; comprising a reverted gear train having driving and intermediate driven elements, a first clutch for the driving element, a second clutch, an openable coupling between the second clutch and an intermediate driven element, clutch-operating means for closing only the first clutch when the coupling is closed whereby first gear operation of said transmission is instituted with torque passing through the reverted gear train, a final driven shaft, a planetary gear train connecting said intermediate driven element and the driven shaft, said planetary train having a sun gear adapted to be locked and released by a brake, an electrical circuit for closing said first clutch to institute first gear operation including in series an armature of said generator and said operating means for the first clutch, a series electrical circuit including said battery and means for closing said second clutch, a series electrical circuit including said battery and means for closing said brake, a switch operated by means responsive to the speed of said final shaft adapted at a first pre-set value to energize said brake circuit to institute a second gear operation of said transmission through said reverted gear train, a second switch operated by means responsive to the speed of said final shaft when it exceeds a second pre-set value to energize said second clutch circuit and deenergize said first clutch and brake circuits to institute third gear operation of said transmission without torque passing through said reverted gear train, and a third switch operated by means responsive to the speed of said final shaft when it exceeds a third pre-set value of speed adapted to complete said brake circuit to institute fourth gear operation of said transmission.

24. An automatically controlled transmission for a variable speed prime mover, the transmission having an intermediate shaft and low and high speed power trains thereto including respectively first and second clutches, a driven shaft and a two-speed planetary gear unit coupling the intermediate shaft to the driven shaft, the planetary gear unit having a control brake adapted to change the unit from low to high speed operation upon closure of the brake, clutch-operating means responsive to the speed of the prime mover and adapted to modulate either clutch closed in response to increasing speed of the prime mover, clutch-control means controlling the clutch-operating means and adapted to effect opening of the first clutch and closure of the second clutch, means operating the brake, means controlling the brake-operating means, switch-operating means responsive to the speed of the driven shaft, and first, second and third switches actuated at first, second and third values of speed, respectively; said first switch controlling the brake-control means to effect closure of the brake; said second switch controlling both the clutch-control and brake-control means to effect opening of the brake, opening of the first clutch and closure of the second clutch; and said third switch controlling the brake-control means to effect reclosure of the brake.

25. An automatically controlled transmission for a variable speed prime mover, the transmission having an intermediate shaft and low and high speed power trains thereto including respectively first and second clutches, a driven shaft and a two-speed planetary gear unit coupling the intermediate shaft to the driven shaft, the planetary gear unit having a control brake adapted to change the unit from low to high speed operation upon closure of the brake, clutch-operating means responsive to the speed of the prime mover and adapted to modulate either clutch closed in response to increasing speed of the prime mover, electrically operated control means controlling the clutch-operating means and adapted when energized to effect opening of the first clutch and closure of the second clutch, means operating the brake, electrically-operated control means controlling the brake-operating means and adapted when energized to effect closure of the brake, switch-operating means responsive to the speed of the driven shaft and first, second and third switches actuated by the switch-operating means at first, second and third values of speed, respectively; and energizing circuits for the clutch-control and the brake-control means; said first switch being adapted to close the energizing circuit for the brake-control means, said second switch being adapted to open the energizing circuit for the brake-control means and close the energizing circuit for the clutch-control means, and said third switch being adapted to reclose the energizing circuit for the brake-control means.

26. An automatically controlled transmission for a variable speed prime mover, the transmission having an intermediate shaft and low and high speed power trains thereto including respectively first and second clutches, a driven shaft and a two-speed planetary gear unit coupling the intermediate shaft to the driven shaft, the planetary gear unit having a control brake adapted to change the unit from low to high speed operation upon closure of the brake, clutch-operating means responsive to the speed of the prime mover and adapted to modulate either clutch closed in response to increasing speed of the prime mover, electrically operated control means controlling the clutch-operating means and adapted when energized to effect opening of the first clutch and closure of the second clutch, means operating the brake, electrically-operated control means controlling the brake-operating means and adapted when energized to effect closure of the brake, switch-operating means responsive to the speed of the driven shaft and first, second and third switches actuated by the switch-operating means at first, second and third values of speed, respectively; the second switch having normally closed and normally open contacts and the other switches being normally open; a first circuit including the first switch, the normally closed contacts of the second switch and the brake-control means; a second circuit including the normally open contacts of the second switch and the clutch-control means; and a third circuit including the third switch and the brake-control means.

27. An automatically controlled transmission as set forth in claim 26, wherein the third circuit further includes a normally closed switch, the prime mover having an accelerator adapted to open said normally closed switch when the accelerator is fully depressed.

MARTIN P. WINTHER.

REFERENCES CITED

The following references are of record in the file of this patent:

UNITED STATES PATENTS

| Number | Name | Date |
| --- | --- | --- |
| 2,100,810 | Livermore | Nov. 30, 1937 |
| 2,103,540 | Livermore | Dec. 28, 1937 |
| 2,169,216 | Bloxsom | Aug. 15, 1939 |
| 2,202,378 | Hertrich | May 28, 1940 |
| 2,252,009 | Kenny | Aug. 12, 1941 |
| 2,317,423 | Vincent | Apr. 27, 1943 |
| 2,342,960 | Neracher et al. | Feb. 29, 1944 |
| 2,375,440 | Roche | May 8, 1945 |
| 2,397,883 | Peterson et al. | Apr. 2, 1946 |
| 2,454,614 | Peterson et al. | Nov. 23, 1948 |